Patented July 8, 1947

2,423,773

UNITED STATES PATENT OFFICE 2,423,773

PURIFICATION OF GELATIN

John Alfred Henry Hart and Edward William Lee, Ilford, England, assignors to Iford Limited, Ilford, England, a British company No Drawing. Application May 19, 1943, Serial No. 487,664. In Great Britain June 24, 1942.

10 Claims. (Cl. 260—118)

This invention relates to the purification of gelatin.

It is well known that normal gelatin as received from the manufacturers may contain impurities which on burning the gelatin away leave an ash which may be as much as 2% or even more of the weight of the gelatin. These impurities, with others which may be present initially but do not appear in the ash content, may have undesirable effects on the behaviour of the gelatin during subsequent use.

The present invention is concerned with a method of reducing the quantity of such impurities in gelatin. It is found that the purified gelatin obtained is of especial value in the production of clear photographic gelatin layers such as substrata, supercoat layers, filter layers and antihalation layers, in the production of gelatino-silver halide emulsion layers, and in general in all cases where photographic layers having a basis of gelatin are required. Moreover, the purified gelatin is of especial value in the production of light filters which consist of dyed gelatin sheets.

According to the present invention the quantity of undesirable impurities present in the gelatin is reduced by treating the gelatin with a solution, in a mixture of water and a water-miscible organic non-solvent for the gelatin, of an acid which forms, with the cations of impurities present in the gelatin, salts which are soluble to a substantial extent in the said solution. The concentration of acid employed is preferably such that during the treatment the gelatin is brought to its isoelectric condition.

A mixture of water and a water-miscible organic non-solvent for the gelatin serves to permit some swelling of the gelatin, which facilitates the purification, whilst preventing undue swelling which might make the purified product difficult to handle. A very convenient mixture to employ is a mixture of water and ethyl alcohol. In such a mixture the alcohol should preferably not be less than about 30% or undue swelling will occur and not more than about 70% or insufficient swelling will take place. A mixture of 50 parts water and 50 parts of 95% alcohol by volume is quite satisfactory. Other water miscible lower alcohols, e. g. methyl alcohol, n-propyl alcohol and isopropyl alcohol and other water miscible organic non-solvents for the gelatin e. g. acetone, dioxane and ethylene glycol monoethyl and monomethyl ethers, may also be employed. The term "lower alcohol" used herein is to be understood as including only alcohols containing 1 to 3 carbon atoms.

As indicated above the quantity of acid employed is preferably such that the gelatin is brought to its isoelectric condition. In general the required quantity of acid will vary from one gelatin to another as a result of differences in the conditions of manufacture of the gelatin. In general, the concentration of acid employed may be such that the gelatin is brought to a pH below that of its isoelectric condition, if the acid chosen is such that a small residue of it remaining in the gelatin will have no harmful effect on the desired behaviour of the gelatin. If the gelatin is required to be free from residual acid of any kind, the treatment with acid solution containing more acid than is necessary to bring it to its isoelectric condition may be followed immediately by treatment with a mixture of water and organic non-solvent containing no acid.

A large number of acids is available any of which may be employed either singly or as mixtures to satisfy the conditions above set forth. Examples are hydrochloric, nitric acetic, lactic, maleic, benzoic, phthalic, benzene-sulphonic, phenol-sulphonic, salicyl-sulphonic and salicyclic acids. Sulphuric and phosphoric acids are somewhat less effective when the gelatin contains cations of the alkaline earth group, as the sulphates and phosphates of such metals are relatively insoluble.

The purification can most readily be effected by stirring the gelatin, preferably in powder or flake form, in the solution defined above, at normal room temperature. However, the treatment may be effected at higher or lower temperatures. The treatment may be effected for periods varying from a few minutes up to an hour or more as desired.

EXAMPLE 1

First treatment 100 gms. of gelatin in the form of powder or flake was placed in a muslin-bottomed sieve and immersed in a solution of 4 gms. of salicyclic acid in 10 litres of 50% aqueous ethyl alcohol, at a temperature of 50–60° F. The gelatin became swollen and was continuously stirred over a period of 6 hours.

Second treatment

The sieve and its contents were then removed, allowed to drain, and then stirred with two separate quantities of 1 litre of 95–99% ethyl alcohol for 30 minutes each. The gelatin was then allowed to drain thoroughly, spread out on muslin and allowed to dry overnight.

The purified gelatin so obtained showed no tendency to cake together during drying and dissolved readily in the usual gelatin solvents. A sample with an original ash content of 1.71% yielded a purified gelatin of ash content about 0.01% when treated by this process.

EXAMPLE 2

This example illustrates variation in the nature of the acid employed. The procedure indicated in Example 1 was followed using the following acids in the quantities stated.

| Acid | Quantity of acid dissolved in 10 litres of 50% aqueous alcohol, per 100 gms. of gelatin treated |
|---|---|
| Hydrochloric acid | 30 ccs. N/1 solution. |
| Nitric acid | 52 ccs. N/1 solution. |
| Acetic acid (glacial) | 5 ccs. |
| Lactic acid | 6 ccs. |
| Maleic acid | 3.4 gms. |
| Benzoic acid | 12 gms. |
| Phthalic acid | 9 gms. |
| Benzene sulphonic acid | 30 ccs. of 30% aqueous solution. |
| Phenol sulphonic acid | 30 ccs. of 30% aqueous solution. |
| Salicyl sulphonic acid | 6 gms. |

In all cases a very effective purification of the gelatin was obtained.

EXAMPLE 3

This example illustrates variations in the nature and proportions of the organic non-solvent employed and in the temperature and time of treatment. The procedure followed was as in Example 1, and the variations from that example are set out in the following table:

| Example No | 3a | 3b | 3c | 3d | 3e | 3f | 3g | 3h | 3i |
|---|---|---|---|---|---|---|---|---|---|
| 1st Treatment | | | | | | | | | |
| Quantity of gel., gms. | 100 | 100 | 100 | 100 | 150 | 150 | 100 | 100 | 100. |
| Non-Solvent | Acetone | Acetone | Methyl alcohol. | Methyl alcohol. | Methyl alcohol. | Ethyl alcohol 99%. | Ethylene glycol mono methyl ether. | Dioxane | Ethyl alcohol 95%. |
| Volume of non-solvent, litres. | 5 | 6 | 5 | 6 | 9 | 9 | 3 | 2½ | 6. |
| Volume of water, litres. | 5 | 4 | 5 | 4 | 1 | 1 | 2 | 2½ | 4. |
| Acid employed | Salicylic | Salicylic | Salicylic | Salicylic | Acetic | Salicylic | Phthalic | Hydrochloric. | 1-methyl tridecyl sulphuric. |
| Quantity of acid | 5 gms | 5 gms | 5 gms | 5 gms | 10 ccs | 7.5 gms | 10 gms | 30 ccs. N/1 soln. | 20 ccs. 25% soln. |
| Time of treatment, hrs. | 4 | 4 | 4 | 4 | 6½ | 1 | 2 | 3 | 3. |
| Temp. of treatment, °F. | 65 | 65 | 65 | 65 | 75 | 115 | 70 | 65 | 70. |
| 2d Treatment | | | | | | | | | |
| Non-Solvent | Ethyl alc. 95%. | Ethyl alc. 95%. | Ethyl alc. 95%. | Ethyl alc. 95%. | None | None | None | Dioxane | Ethyl alc. 95%. |
| Volume of non-solvent, litres. | 2 | 2 | 2 | 2 | | | | 1 | 1.4. |
| Volume of water, litres. | 0 | 0 | 0 | 0 | | | | 0.2 | 0.6. |
| Time of treatment, hrs. | ½ | ½ | ½ | ½ | | | | ½ | 1. |
| Temp. of treatment, °F. | 65 | 65 | 65 | 65 | | | | 65 | 70. |

In all cases the gelatin obtained had a much reduced ash content.

The purification procedure indicated above and illustrated in the foregoing examples presents many advantages. Thus the gelatin does not require any special preliminary treatment such as dissolving and shredding, but may be treated in the form of thin leaf, flake or powder, in which forms it is usually supplied by the manufacturers. Only one major treatment is usually necessary in contradistinction to many prior processes suggested for purifying gelatin, where several washings with a purification liquid have been necessary.

By keeping the swelling of the gelatin low the purified gelatin can be drained rapidly and dried without elaborate plant. Moreover the treatment leaves the gelatin substantially unchanged in form and in a condition in which it is readily soluble in the usual gelatin solvents. Little attention is required to operate the process, it may be operated at normal room temperatures, and no accurate temperature control is necessary. The alcohol or other organic non-solvent for the gelatin which is used in the process may readily be recovered.

As already indicated, gelatin prepared by the process of this invention is of especial value in the production of clear photographic gelatin layers. In particular, the purified gelatin is of especial value as a basis for the substrata which are normally applied to photographic film base before the photographic emulsion or other gelatin layer is coated in order to secure satisfactory adhesion between the film base and the emulsion or other gelatin layer.

It is found that gelatin purified by the process of this invention may be dissolved to form solutions which, on coating on film base made from organic colloids such as cellulose esters, and drying, yield substrata capable of giving considerably improved adhesion of gelatin layers to the film base. The purified gelatin is especially valuable in this connection in forming substrata on cellulose acetate film base. Solutions used for coating such substrata are referred to hereinafter as "subbing" solutions.

In the production of a purified gelatin intended for use as the basis of photographic substrata it is preferred to employ an organic acid, and particularly salicylic acid, for the purification since organic acids are preferred as stabilisers for the subbing solution. In such a case the gelatin may be brought during the treatment to a pH lower than that corresponding to its isoelectric condition, as a small residue of the organic acid has no harmful effect on the behaviour of the gelatin in a subbing solution.

The dispersions in organic liquids of the purified gelatin produced by this invention, such as subbing solutions, are of reduced opalescence and possess greater stability compared with similar solutions obtained from untreated gelatin. It is possible to obtain clear, i. e. non-opalescent, subbing solutions which contain a substantially higher proportion of gelatin, e. g. 3% or 4%, than can usually be obtained using untreated gelatin. Moreover, the purified gelatins of the present invention make possible the production of subbing solutions which contain a smaller proportion of stabilising acid than is usual in such solutions. Furthermore the purified gelatin can be used to formulate stable subbing solutions containing higher proportions of non-hydroxylic solvents, e. g. acetone, compared with the proportion possible when using unpurified gelatin.

The following are examples of solutions suitable for forming a subcoat on photographic film base.

A. For various cellulose organic ester film bases:

| | | |
|---|---|---|
| Gelatin | 10 gms. | 10 gms. |
| Nitrocellulose | 2 gms. | ------ |
| Salicylic acid | 2 gms. or | 2.5 gms. |
| Distilled water | 30 ccs. | 30 ccs. |
| Methyl alcohol | 370 ccs. | 60 ccs. |
| Acetone | 600 ccs. | 900 ccs. |

B. For cellulose nitrate film base:

| | | |
|---|---|---|
| Gelatin | grams | 5 |
| Salicylic acid | do | 1 |
| Distilled water | cubic centimeters | 20 |
| Ethyl alcohol | do | 780 |
| Acetone | do | 200 |

In addition to its use in substrata, the purified gelatin of this invention may, as indicated above, be employed in the production of other photographic layers having a basis of gelatin, e. g. gelatino-silver halide emulsion layers, filter layers, supercoat layers and the like. It presents a particular advantage in the manufacture of dyed filter layers since by its use it is possible to obtain such layers almost entirely free from haze, even when using dyes which are particularly prone to form precipitates (resulting in haze) with most untreated gelatins.

What we claim is:

1. A process for purifying gelatin which comprises treating the gelatin in finely divided form with a solution of an acid in a mixture of water and a water-miscible organic non-solvent for the gelatin, said acid being one which forms, with the cations of the impurities in the gelatin, salts which are soluble to a substantial extent in the said solution, at a pH not above the isoelectric point of the gelatin, said mixture containing a substantial amount of non-solvent and insufficient water to produce substantial swelling of the gelatin, and separating the solution from the gelatin.

2. A process for purifying gelatin which comprises treating the gelatin in finely divided form with a solution of an acid in a mixture of water and a water-miscible organic non-solvent for the gelatin, said acid being one which forms, with the cations of the impurities in the gelatin, salts which are soluble to a substantial extent in the said solution, said acid being present in such concentration that during the treatment the gelatin is brought to the isoelectric condition, said mixture containing a substantial amount of non-solvent and insufficient water to produce substantial swelling of the gelatin, and separating the solution from the gelatin.

3. A process for purifying gelatin which comprises treating the gelatin in finely divided form with a solution of an acid in a mixture of water and a water-miscible alcohol, said acid being one which forms, with the cations of the impurities in the gelatin, salts which are soluble to a substantial extent in the said solution, at a pH not above the isoelectric point of the gelatin, said mixture containing a substantial amount of water-miscible alcohol and insufficient water to produce substantial swelling of the gelatin, and separating the solution from the gelatin.

4. A process for purifying gelatin which comprises treating the gelatin in finely divided form with a solution of an acid in a mixture of water and a water-miscible alcohol, said acid being one which forms, with the cations of the impurities in the gelatin, salts which are soluble to a substantial extent in the said solution, said acid being present in such concentration that during the treatment the gelatin is brought to the isoelectric condition, said mixture containing a substantial amount of water-miscible alcohol and insufficient water to produce substantial swelling of the gelatin, and separating the solution from the gelatin.

5. A process for purifying gelatin which comprises treating the gelatin in finely divided form with a solution of an acid in a mixture of water and a water-miscible organic non-solvent for the gelatin, said acid being one which forms, with the cations of the impurities in the gelatin, salts which are soluble to a substantial extent in the said solution, at a pH not above the isoelectric point of the gelatin, said mixture containing a substantial amount of non-solvent and insufficient water to produce substantial swelling, and thereafter washing the gelatin with a mixture of water and a water-miscible organic non-solvent for the gelatin which does not contain any such acid.

6. A process for purifying gelatin which comprises treating the gelatin in finely divided form with a solution of salicylic acid in a mixture of water and a water-miscible organic non-solvent for the gelatin, at a pH not above the isoelectric point of the gelatin, said mixture containing a substantial amount of non-solvent and insufficient water to produce substantial swelling of the gelatin, and separating the solution from the gelatin.

7. A process for purifying gelatin which comprises treating the gelatin in finely divided form with a solution of salicylic acid in a mixture of water and a water-miscible organic non-solvent for the gelatin, said mixture containing a substantial amount of non-solvent and insufficient water, the salicylic acid being present in such concentration that during the treatment the gelatin is brought to that isoelectric condition.

8. A process for purifying gelatin which comprises stirring gelatin in the form of powder in a solution of salicylic acid in a mixture of water and a saturated aliphatic alcohol of 1 to 3 carbon atoms at a pH not above the isoelectric point of the gelatin, said mixture containing a substantial amount of a non solvent and insufficient water to produce substantial swelling of the gelatin, and separating the solution from the gelatin.

9. A process for purifying gelatin which comprises stirring gelatin in the form of powder in a solution of salicylic acid in a mixture of water and a saturated aliphatic alcohol of 1 to 3 carbon atoms, said mixture containing a substantial amount of alcohol and insufficient water to produce substantial swelling of the gelatin, and the salicylic acid being present in such concentration that during the treatment the gelatin is brought to the isoelectric condition.

10. A process for purifying gelatin which comprises stirring gelatin in the form of powder in a solution of salicylic acid in a mixture of water and a saturated aliphatic alcohol of 1 to 3 carbon atoms, the mixture containing a substantial amount of alcohol and insufficient water to produce substantial swelling of the gelatin, the salicylic acid being present in such concentration that during such treatment the gelatin is brought to the isoelectric condition, and thereafter washing the gelatin with a mixture of water and said alcohol.

JOHN ALFRED HENRY HART.
EDWARD WILLIAM LEE.

REFERENCES CITED

The following references are of record in the file of this patent:

UNITED STATES PATENTS

| Number | Name | Date |
| --- | --- | --- |
| 1,457,466 | Smith | June 5, 1923 |
| 2,191,206 | Schwartz | Feb. 20, 1940 |

FOREIGN PATENTS

| Number | Country | Date |
| --- | --- | --- |
| 153,526 | Great Britain | Nov. 11, 1920 |

OTHER REFERENCES

Proteins and Their Theory of Colloidal Behavior, Loeb. McGraw-Hill Book Company, 1st edition, 1922 (pp. 253–255).